US007547027B2

(12) United States Patent
Bohn

(10) Patent No.: US 7,547,027 B2
(45) Date of Patent: Jun. 16, 2009

(54) ARMREST ROLLING WALKER WITH REMOVABLE UTILITY TRAY

(76) Inventor: David Bohn, 1712 17th St., Nitro, WV (US) 25143

(*) Notice: Subject to any disclaimer, the term of this patent is extended or adjusted under 35 U.S.C. 154(b) by 215 days.

(21) Appl. No.: 11/701,764

(22) Filed: Feb. 2, 2007

(65) Prior Publication Data

US 2008/0185797 A1 Aug. 7, 2008

(51) Int. Cl.
*B62M 1/00* (2006.01)

(52) U.S. Cl. ............................... 280/87.021; 280/87.05

(58) Field of Classification Search .............. 280/87.05, 280/87.021, 642, 647, 47.4, 304.1, 250.1, 280/47.38; 135/67, 66, 85; 297/344.12, 297/188.2, 153

See application file for complete search history.

(56) References Cited

U.S. PATENT DOCUMENTS

| | | | | |
|---|---|---|---|---|
| 3,625,237 | A | 12/1971 | Wertz | |
| 3,957,071 | A | 5/1976 | Kenner | |
| 4,248,256 | A | 2/1981 | Thomas | |
| 4,510,956 | A | 4/1985 | King | |
| 4,659,099 | A | 4/1987 | Malone | |
| 4,708,274 | A | 11/1987 | Roche | |
| 4,867,506 | A * | 9/1989 | Chavez | 297/188.2 |
| 4,907,794 | A | 3/1990 | Rose | |
| 5,224,717 | A | 7/1993 | Lowen | |
| 5,657,783 | A | 8/1997 | Sisko et al. | |
| 5,671,765 | A | 9/1997 | Hagberg, Jr. | |
| 5,694,959 | A * | 12/1997 | Hiller et al. | 135/66 |
| 5,772,234 | A | 6/1998 | Luo | |
| 5,887,887 | A * | 3/1999 | Keuning | 280/641 |
| 6,099,002 | A | 8/2000 | Uchiyama | |
| 6,279,591 | B1 | 8/2001 | Obitts | |
| 6,296,263 | B1 | 10/2001 | Schultz et al. | |
| 6,311,708 | B1 | 11/2001 | Howle | |
| 6,318,392 | B1 | 11/2001 | Chen | |
| 6,338,355 | B1 * | 1/2002 | Cheng | 135/67 |
| 6,378,883 | B1 * | 4/2002 | Epstein | 280/250.1 |
| 6,481,730 | B2 * | 11/2002 | Sung | 280/87.05 |
| 6,494,469 | B1 | 12/2002 | Hara et al. | |
| 6,817,372 | B2 | 11/2004 | Ennals et al. | |

(Continued)

OTHER PUBLICATIONS

Nova 4201 Cruiser Delux Rollator. Jun. 23, 2003 "Preferred Healthcare" Patient aid & mobilty center.

(Continued)

*Primary Examiner*—Hau V Phan
(74) *Attorney, Agent, or Firm*—Robert R. Reed

(57) ABSTRACT

The present invention provides a rolling walker with a pair of armrest platforms and vertical handles in combination with a removable utility tray. The armrest platforms provide added or alternate support for a patient not provided by a conventional four wheeled rolling walker. A utility tray assembly provides a tray top and a drawer for patient care services. The armrest platforms are supported at a vertical distance above the ground surface by a pair of armrest frames. The armrest frames are carried by the main frame of the conventional walker. The armrest frames each includes a main armrest frame member, a diagonal member and an armrest support member to carry the armrest platform and vertical handles with hand brakes. The armrest platforms can be adjusted in both horizontally and vertically with respect to the main frame of the conventional walker for better distribution of the user's weight. The utility tray assembly rests on the armrest platforms when needed.

17 Claims, 4 Drawing Sheets

U.S. PATENT DOCUMENTS 6,837,503 B2 1/2005 Chen et al.
6,883,529 B2 4/2005 Kvaternik
7,040,637 B2 * 5/2006 Owens et al. .......... 280/87.021
7,052,030 B2 * 5/2006 Serhan .................... 280/304.1
7,066,484 B2 * 6/2006 Willis et al. ................ 280/642
7,073,801 B2 * 7/2006 Sanders et al. ........... 280/87.05

OTHER PUBLICATIONS

"Dr. Leonards" Catalog Dec. 2006 Item #24731 Walker Tray.

* cited by examiner

ARMREST ROLLING WALKER WITH REMOVABLE UTILITY TRAY

BACKGROUND OF THE INVENTION

This invention is directed to a combination rolling walker and a patient care system to assist medical patients and more particularly to a 4-wheeled rolling walker having armrest platforms and vertical handles with a removable utility or serving tray assembly carried by the armrest platforms to both transport the patient and provide patient care needs.

There are a number of conventional walkers that combine a light weight folding frame that is easy to lift and store and perfect for strolling outdoors. They include four wheels of relatively small size (i.e. six inch diameter) with two wheels having a hand brake assembly. A seat with a backrest is provided so the user can set the handbrake and take a rest. A basket may also be provided under the seat for shopping and/or to carry personal items as the users rests their forearms on the platforms and grips the vertical handles to assist them in walking. The rolling walker with armrest platforms and a vertical handle is disclosed in U. S. Patent application Publication No. 2005/0156395 by the present inventor and U.S. Pat. No. 5,224,717. The "armrest walkers" are essentially modifications of conventional walkers. Conventional walkers having four wheels, horizontal handles and a seat and/or a shopping basket typical of the industry are disclosed in U.S. Pat. Nos. 4,907,794; 5,772,234; 6,099,002; 6,311,708; 6,318,392; 6,494,469; and 6,837,503. The conventional rolling walker or "rollator" with horizontal handles provides little support for users not strong enough to fully support their own weight. Modifications to the conventional walker to obtain the armrest walker can be provided as an aftermarket device. The disclosure of U.S. Patent Application Publication No. 205/0156395 illustrates how this can be done.

Platforms used on walkers and crutches to support forearms are disclosed in U.S. Pat. Nos. 3,625,237; 4,248,256; 4,510,956; 5,567,783; 5,671,765 and 6,279,591. Generally speaking these references do not include all the essential features of providing support for both forearms, providing vertical handles for steering the walker and allowing adjustments in the height and horizontal location of the armrest platforms. The references do not disclose an aftermarket device for the conversion of the four wheeled walker with horizontal handles to a walker with vertical handles.

The opportunity exists for using an armrest walker for ambulatory use and providing support for a removable patient care system or service tray when the walker is not being used as a walker. The height of the armrest platforms is ideal for the addition of a tray to be used by the patient care professional and/or the patient during non-ambulatory times. A further convenience is provided when the tray has a drawer for storage of personal and medical items. A number of references disclose using an added or removable tray with a walker. Examples of these include U.S. Pat. Nos. 3,957,071; 4,659,099; 4,708274; 5,694,959; 6,296,263; 6,817,372 and 6,883,529. A drawer is also provided with the tray in the disclosure of U.S. Pat. Nos. 4,659,099 and 6,817,372.

Accordingly, an object of the present invention is to provide a armrest walker that allows the user to stand erect to steer the walker and distribute part of their weight on the walker as they move from place to place with the aid of the walker.

An essential object of the present invention is to provide additional structural components to include armrest platforms and vertical handles that independently adjust horizontally to best support the user's weight and provide better steering control.

Another object of the present invention is to provide a removable utility tray assembly to be used by the patient care provider and the patient to function as a serving tray and/or bed table and for storage of personal items and medical supplies.

Yet another object of the present invention is to provide a utility tray assembly that can be removed and stored until needed again for patient care and convenience.

One additional object of the present invention is to provide a combination armrest assembly and utility tray assembly that can be used as an aftermarket device for the conventional rolling walker by removing the horizontal handles.

SUMMARY OF THE INVENTION

The above objectives are accomplished according to the present invention by providing a pair of armrest platforms and vertical handles so the user of a rolling walker can have support not provided by a conventional rolling walker or rollator. In combination with the armrest walker a removable utility tray assembly is placed on the armrest platforms to provide a patient care system. The armrest platforms are supported at a vertical distance above the ground surface by providing a pair of armrest frames each extending between the main frame of the armrest walker and a respective armrest platform. Hand brakes are also operated when gripping the vertical handles. The armrest platforms can be adjusted in both horizontally and vertically with respect to the four wheels of the armrest walker for better distribution of the user's weight.

In one embodiment of the invention, a combination rolling walker and patient care system comprises a conventional walker base having two front and two rear legs each having a wheel at a bottom end and a seat assembly. An armrest assembly is attached to the base including a pair of armrest frames each supporting an armrest platform to provide a height adjustment when supporting the patient while walking. A pair of control assemblies are each attached to a respective armrest frame, including a vertical handle and a hand brake assembly, so the patient can control the movement of the walker. The invention further comprises a removable utility tray assembly supported on each lateral side by a respective armrest platform for providing patient care services for the patient.

In another embodiment of the invention, an improvement in a rolling walker having four wheels, a main frame, a pair of hand brake assemblies for braking two of the four wheels, a back rest member and a seat for a patient to sit and rest when not walking comprises a pair of armrest frames each having a main armrest frame member, an armrest support member and a diagonal member. The frames are each adjustably supported by a rear leg of the main frame of the conventional walker. An armrest platform is adjustably attached to each armrest support member at a horizontal location to help support the patient's weight with respect to the center of contact of the four wheels. A pair of essentially vertically disposed handles are each affixed to a respective armrest support member and are adjustably supported independent of said armrest platform to allow the patient to better steer the platform walker. The invention further comprises a removable utility tray assembly supported on each lateral side by a respective armrest platform for providing patient care services for the patient.

In a further embodiment of the invention a system for providing ambulatory assistance and patient care comprises a rolling walker having a main frame, including main frame front legs and main frame rear legs, supported on four wheels so that the main frame can be folded for storage and transporting from place to place. A seat with a padded back rest provides basic support for the patient during periods of rest. The invention further comprises a pair of armrest frames each having a main armrest frame member with a plurality of frame apertures near a lower end. An armrest support member is affixed at an upper end of each main armrest frame member. A pair of height adjustment assemblies of the main frame adjustably receive and support a respective armrest frame; so that the armrest support members are essentially horizontally disposed at a vertical location above a ground surface. An armrest platform is adjustably attached and solidly connected by armrest attachments to each armrest support member at a horizontal location to best support the patient's weight. A pair of vertically disposed handles are each affixed to a respective armrest support member to be independently adjustable both vertically and horizontally with respect to a respective armrest platform. The armrest platforms and the handles provide improved ambulatory assistance to the patient. A hand brake, associated with each vertical handle, is operated by the user to stop two of said four wheels from rotating. The invention further comprises a removable utility tray assembly supported on each lateral side by a respective armrest platform for providing patient care services for the patient.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
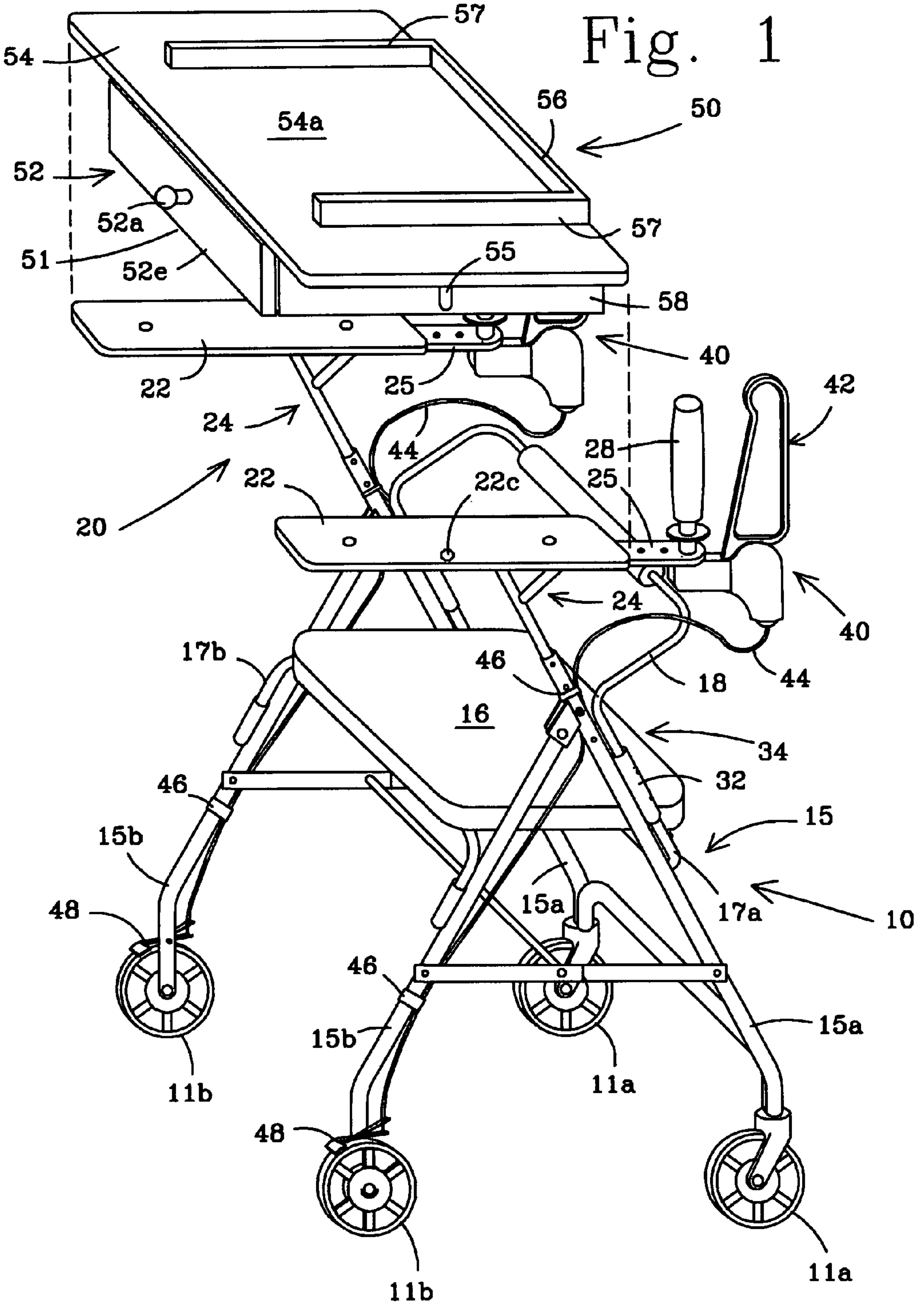
FIG. 1 is a perspective view of a armrest walker combined with a utility tray assembly, wherein the utility tray assembly can be placed on the armrest platforms of the armrest walker to provide a patient care system.

Referring now in more detail to the drawings, the invention will now be described in more detail. A conventional four wheeled rolling walker, known in the art as a "rollator" walker has been modified to provide an armrest walker. The armrest walker 10 is combined with a utility tray assembly 50 as illustrated in FIG. 1. The armrest walker includes a folding main frame 15, supporting a pair of armrest assemblies 20. The main frame includes a pair of main frame front legs 15*a*, a pair of main frame rear legs 15*b* and a rear leg pivot device 14 so that the main frame folds for storage and transporting from place to place. A pair of main frame braces 15*c* maintains the conventional walker in a deployed configuration. The armrest walker is also designed to provide a seat assembly 34 for the user to sit and rest when needed or desired. A seat 16 is supported from main frame 15 by a front seat support 17*a* and a rear seat support 17*b*. A backrest member 18 connected with main frame 15 by a back rest sleeve 32 to support the user's back when the user is setting down. Two rear wheels of the four wheels operate as breaking wheels 11*b* and two front wheels operate as castered wheels 11*a*. A basket (not shown) may also be provided under the seat for shopping and/or to carry personal items.

Each armrest assembly includes an armrest frame 24 that carries an armrest platform 22 and a hand control assembly 40. The hand control assembly includes a vertical handle 28 and a brake handle 42. The brake handle is associated through a brake cable 44 to the wheel brakes 48 of the two rear breaking wheels and stop the walker from rolling. Break straps 46 support the brake cables attached to the main frame Each armrest frame is adjustably connected to main frame 15 and includes an armrest support 25 that carries armrest platform 22 and the hand control assembly. The patient rests their forearms on the armrest platforms and grips the vertical handles that assist them in walking.

Utility tray assembly 50 rests on the armrest platforms 22 when the combined system is configured to provide patient care. In the illustration of FIG. 1 the utility tray assembly is displaced above the armrest platforms to show more details of arm rest assembly 20. The utility tray assembly includes a tray top 54 with a rear rail 56 and side rails 57 to keep objects from falling from top surface 54*a* of the tray top. Positioned below the tray top is a drawer assembly 52 having a drawer portion 51 supported by a drawer guide 58 on both lateral sides. A drawer pull 52*a* on a drawer front 52*e* is used to access the inside of the drawer portion.

A unique feature of the arm rest walker is provided by being able to continue to operate the arm rest walker as a walker when the utility tray assembly is in place. A retainer pin 55 can be added below both lateral sides of the tray top to each engage a pin aperture 22*c* in a respective arm rest platform and help hold the utility tray assembly in a stable location on the armrest walker. The pair of retainer pins engage the pin apertures to keep the utility tray assembly in place on the armrest platforms. The forearms of the patent rest on top lateral sides of the tray top and the vertical handles are gripped to maneuver the combined walker and patient care system. Another embodiment of the invention allows the armrest walker and the utility tray assembly to be used separately. The utility tray assembly can be removed from the armrest platforms and places on any flat surface for general use as a table with a drawer.

Figure 2A:
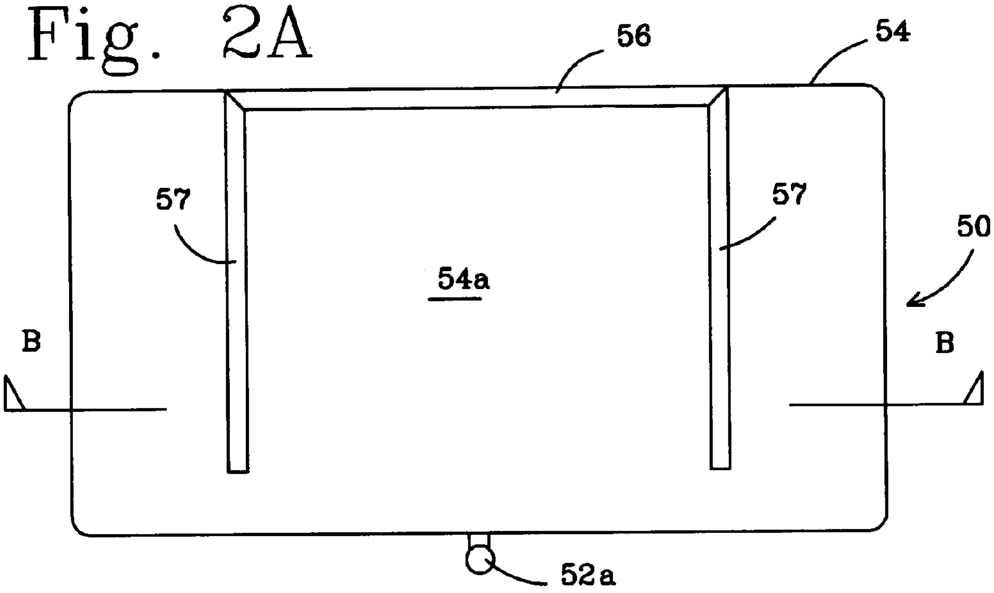
FIG. 2A is a plan view of the utility tray assembly of the present invention of FIG. 1 showing side and rear rails to maintain objects on the top surface of a tray top.
Figure 2B:
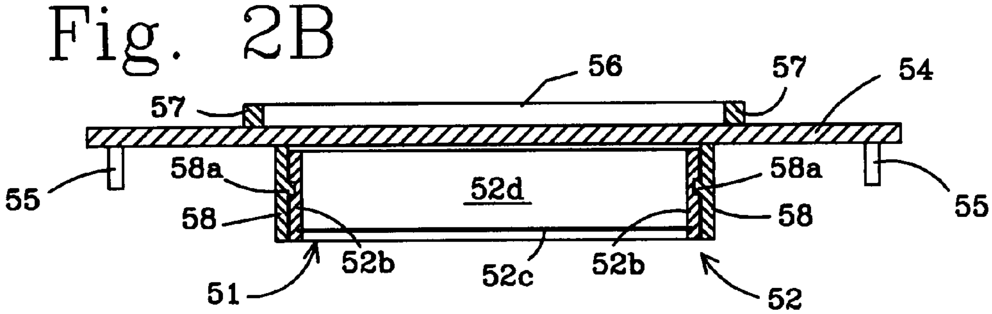
FIG. 2B is a cross-sectional view of the utility tray assembly taken along line B-B in FIG. 2 shows the drawer assembly carried on the bottom side of the tray top.
Figure 2C:
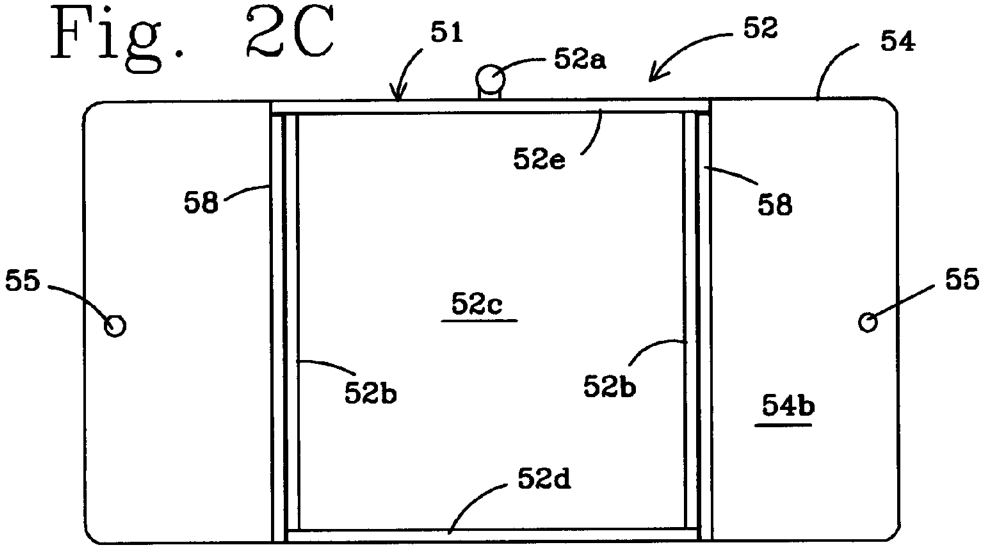
FIG. 2C is a bottom view of the utility tray assembly of FIG. 2 showing additional details of the drawer assembly and retainer pins.

Details of utility tray assembly 50 are illustrated in FIGS. 2A, 2B and 2C. The top plan view of FIG. 2A shows tray top 54 having side rails 57 and a rear rail 56. The rails help retain articles on top surface 54*a* of the utility tray assembly. The cross-sectional view of FIG. 2B shows drawer assembly 52 carried below the tray top. A drawer guide 58 on both lateral sides of the drawer assembly is attached to the tray top. Each drawer guide has a protrusion 58*a* to engage a drawer side 52*b* to slidably support drawer portion 51 of drawer assembly 52. Drawer pull 52*a* is used to access the contents of the drawer portion. A drawer bottom 52*c* and a drawer back 52*d* are also shown in this cross-sectional view. Once again, two retainer pins 55 can be provided to help stabilize the utility tray assembly by the pins engaging the pin apertures 22*c* on armrest platforms 22 (see FIG. 1).

The bottom view of FIG. 2C illustrates drawer assembly 52 carried by bottom surface 54*b* of the utility tray assembly. Drawer guides 58 are fixed to the bottom surface 54*b* of tray top 54. Drawer sides 52*b* are slidably carried by the drawer guides so drawer portion 51 can be opened. Drawer back 52*d* and drawer front 52*e* along with the drawer sides and drawer bottom 52*c* keeps articles in the drawer. Access to articles in the drawer portion is provided by pulling on drawer pull 52*a* to slide the drawer forward.

Figures 3, 3A:
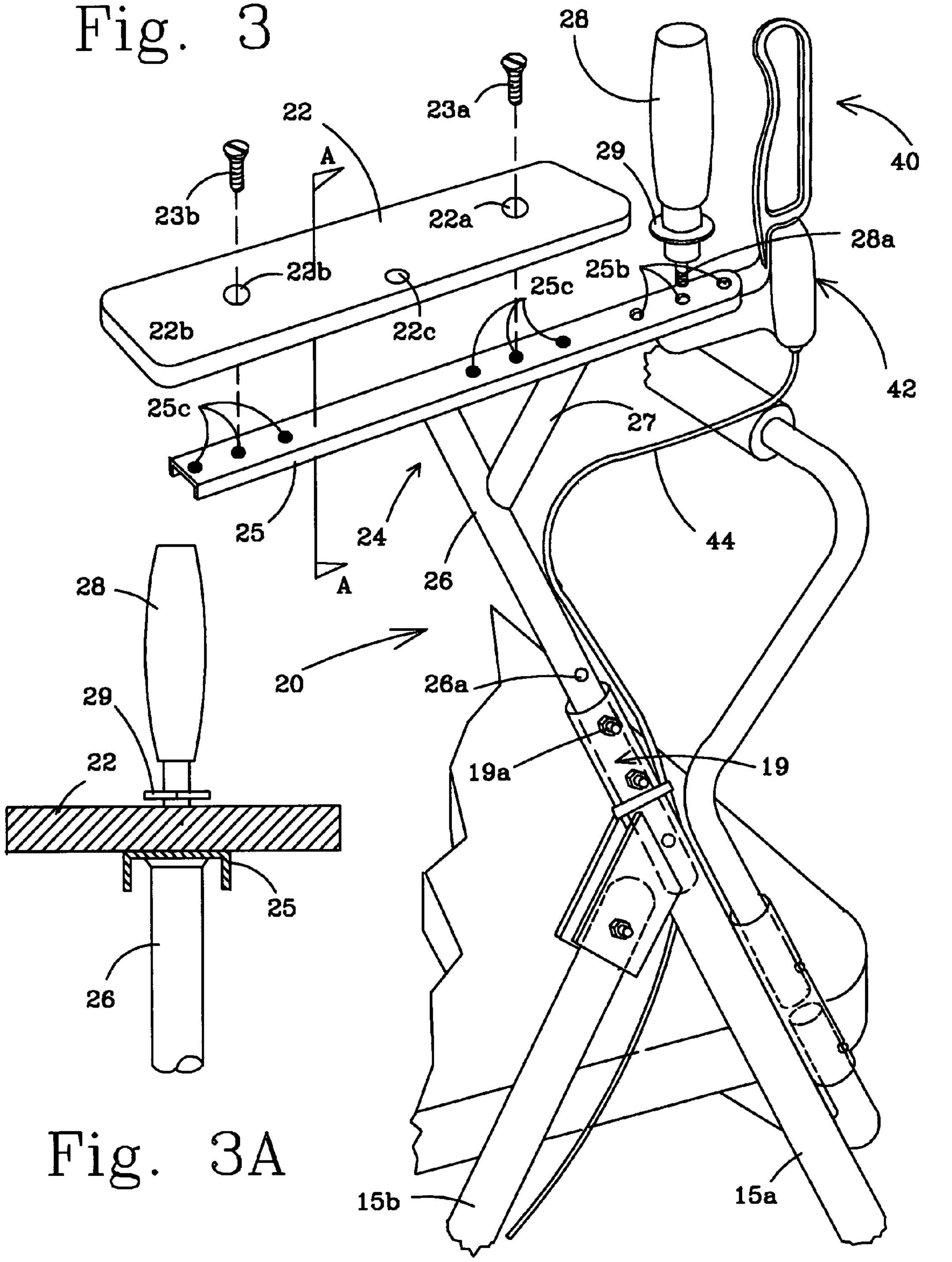
FIG. 3 is a partial perspective view of the armrest walker of FIG. 1 showing the top portion of a conventional walker base with a height adjustment assembly and an armrest assembly.
FIG. 3A is a cross-sectional view of the armrest assembly taken along line A-A in FIG. 3 when the arm rest platform is attached to the arm rest support member.

An exploded view of the components of armrest assembly 20 added to walker base 10 to provide the armrest walker, is shown in FIG. 3. Each armrest frame 24 includes main armrest frame member 26, a brace 27 and armrest support member 25. The armrest support member is affixed to an upper end of the main armrest frame member and the brace.

The effectiveness of the platform walker depends on the selection of a proper height and horizontal location of armrest platforms 22 to properly load the four wheels and prevent the patient from slouching and putting extra stress on their back and forearms. The height adjustment components are shown in the exploded view of FIG. 3. A main height adjustment assembly 19 with fasteners 19*a* allows armrest platform 22 to be height adjusted. Main frame member 26 of armrest frame 24 and front leg 15*a* of walker base both have a plurality of apertures. The desired height is achieved by selecting the proper set of apertures. The vertical distance above the ground is critical in establishing the proper height of the armrest platforms to support a patient at an optimum height for each particular patient. The vertical distance adjustment is commonly in a range of three to four inches to assist the user in standing more erect when using the platform walker. Overall height of the armrest platform from a ground surface is normally in a range of about thirty three inches to about thirty seven inches. For a properly adjusted armrest walker the distribution of the user's weight on the walker is slightly forward of the center of the wheels closer to the castered front wheels to increase stability and maneuverability of the platform walker. The height adjustment is also important in the height of utility tray assembly 50. The same adjustments are possible to provide the optimum location of the utility care assembly for patient care.

In combination with the height adjustment, armrest platforms 22 and hand control assembly 40 are independently adjusted horizontally on armrest support member 25 of armrest frame 24. The exploded view of FIG. 3 shows a plurality of armrest support member attachment apertures 25*c* to receive the armrest fasteners 23*a* and 23*b* through apertures 22*a* and 22*b* in the armrest platform. In addition, a plurality of handle apertures 25*b* are provided to receive a threaded lower end 28*a* of vertical handle 28. Hand break assembly 42 and the vertical handle are attached to armrest support member 25 by the threaded lower end 28*a* of the vertical handle being connected to the hand brake assembly through one of the handle apertures. When the forearms of the user are placed on the armrest platforms, the user grips the vertical handles above a hand rest collar 29 to steer the platform walker from place to place.

The armrest platform attaches to armrest support member 25 at different locations to best locate the center of gravity of the user with respect to the center of contact of the four wheels. Horizontal movements of the armrest platforms are also made to keep the platforms over the front wheels as the height adjustment is made. This gives the patient optimum weight distribution for the armrest walker and allows the patient to be closer to the front wheels of the armrest walker to provide better maneuvering in close quarters, such as in a living room or bath room. Control of the platform and support for the user is more positive with the use of both the forearms and the hands. Users having back problems can receive more support from using the vertical handles and the armrest platforms compared with the horizontal handles of the conventional walker of the art.

The cross-sectional view of FIG. 3A shows the armrest platform 22 attached to arm rest support member 25. The arm rest support member is connected to the top end of the main arm rest frame member 26 and the brace (not shown) of the arm rest frame. Preferably these are metallic members and the connection is made by welding the members together to provide a strong arm rest frame 24. The patient rests a forearm on the top of the arm rest platform, places their hand on hand rest collar 29 and grips vertical handle 28 to provide weight support and to steer the armrest walker.

Figure 4A:
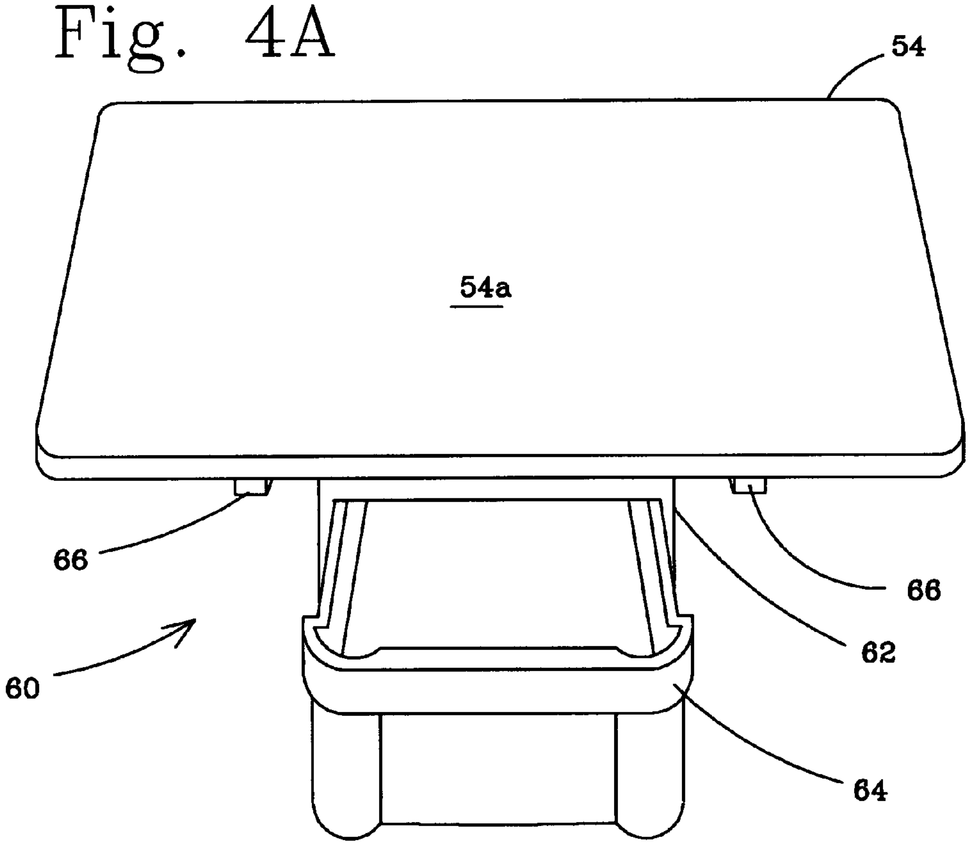
FIG. 4A is a front perspective view of an alternate utility tray assembly showing a patient care drawer attached to the bottom side of the tray.
Figure 4B:
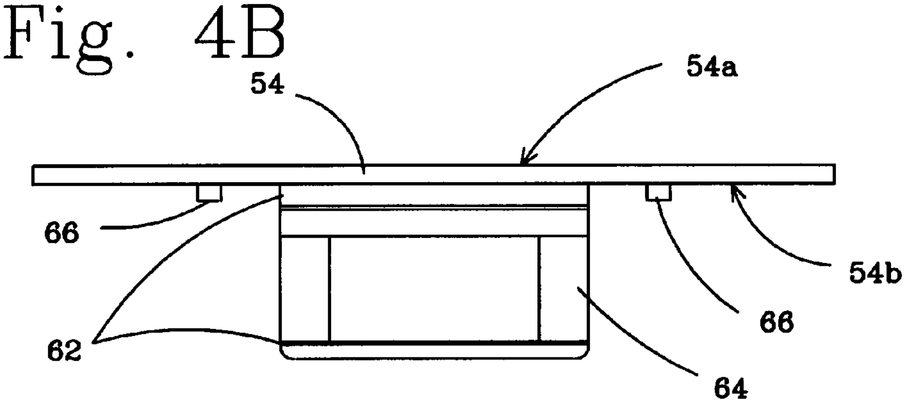
FIG. 4B is a front elevation view of the alternate utility tray assembly of FIG. 4A showing retainer bars to properly locate the tray assembly relative to the armrest platform of the armrest walker.

Another embodiment of the utility tray assembly is illustrated in FIGS. 4A and 4B. An alternate utility tray assembly 60 includes the same tray top 54 with a patient care drawer 64. A drawer frame 62 is attached to the bottom surface 54*b* to receive the patient care drawer. The drawer has a size and depth better suited for the storage and use of medical supplies and medicine for the patient's care. A typical drawer and frame of this type is a "Stacking Drawer" made by IRIS USA, Inc. of Pleasant Prairie, Wis. 53158 and sold by Staples. Retainer bars 66 are attached to bottom surface 54*b* of the tray top to position the alternate utility tray assembly on the armrest platforms. No rails are shown on top surface 54*a* with this embodiment. Rails can be added or not within the scope of this invention.

While a preferred embodiment of the invention has been described using specific terms an a particular prior art reference, such description is for illustrative purposes only, and it is to be understood that changes and variations may be made without departing from the spirit or scope of the following claims.

What is claimed is:

1. A combination rolling walker and patient care system comprising:

a conventional walker base having two front and two rear legs each having a wheel at a bottom end and a seat assembly;

an armrest assembly attached to said base including a pair of armrest frames each supporting an armrest platform to provide a height adjustment when supporting the patient while walking;

a pair of control assemblies each attached to a respective armrest frame including a vertical handle and a hand brake assembly so the patient can control the movement of the walker;

a removable utility tray assembly supported on each lateral side by a respective armrest platform for providing patient care services for the patient;

said pair of armrest frames each include a main frame member, adjustably carried by a respective front leg of said walker base, a brace member and an armrest support member, wherein said armrest support member is affixed to the top of said main frame member and said brace member; and each one of said armrest support members includes a plurality of arm attachment apertures and handle attachment apertures to adjustably affix a respective armrest platform and a respective vertical handle to said armrest platform, wherein each said respective vertical handle is independently adjustable with respect to said respective armrest platform in the horizontal direction to both allow the patient to better adjust the amount and distribution of the patient's weight supported by said respective armrest platform and to allow the patient to grip said respective vertical handle to better steer the walker.

2. The walker and patient care system of claim 1 wherein said utility tray assembly includes:

a tray top with a pair of side rails and a rear rail affixed to a top surface of said tray top;

a drawer assembly affixed to a bottom side of said tray top.

3. The walker and patient care system of claim 2, further including a pair of retainer pins extending from said bottom surface of said table top to engage pin apertures in said table top to help position and hold said utility tray assembly on said armrest platforms.

4. The walker and patient care system of claim 1, wherein said each hand brake assembly of said pair of hand control assemblies includes:

a brake cable running from a brake handle to a wheel brake adjacent said wheel of said front leg; and a ratchet device to allow the brakes to be engaged and maintained without the patient continually gripping the brake handle.

5. The walker and patient care system of claim 4, wherein said height adjustment fastener is a spring loaded button extending from one of said plurality of frame apertures to engage one of said plurality of leg apertures and hold the armrest platforms at a desirable height which is easily adjusted.

6. The walker and patient care system of claim 1, including an armrest frame support and height adjustment assembly comprising:

a plurality of spaced apart frame apertures of each said main armrest frame member;

a plurality of spaced apart leg apertures at a top end of each said front leg; and at least one height adjustment fastener extending through one of said frame apertures and one of said leg apertures to adjustably establish a vertical height of said armrest platforms and said utility tray.

7. A combination rolling walker and patient care system comprising:

a conventional walker base having two front and two rear legs each having a wheel at a bottom end and a seat assembly;

an armrest assembly attached to said base including a pair of armrest frames each supporting an armrest platform to provide a height adjustment when supporting the patient while walking;

a pair of control assemblies each attached to a respective armrest frame including a vertical handle and a hand brake assembly so the patient can control the movement of the walker;

a removable utility tray assembly supported on each lateral side by a respective armrest platform for providing patient care services for the patient;

said utility tray assembly includes a tray top with a pair of side rails, a rear rail affixed to a top surface of said tray top and a drawer assembly affixed to a bottom side of said tray top; and said drawer assembly includes a pair of drawer guides each affixed to a bottom surface of said tray top and having a guide protrusion, a pair of drawer sides made integral with a drawer front, a drawer back, a drawer bottom and a pull, wherein said drawer sides have a notch to engage said guide protrusions of said drawer guides, so that said drawer assembly is slideably carried below said tray top.

8. An improvement in a conventional rolling walker having four wheels, a main frame, a pair of hand brake assemblies for braking two of the four wheels, a back rest member and a seat for a patient to sit and rest when not walking, said improvement comprising:

a pair of armrest frames each having a main armrest frame member, an armrest support member and a diagonal member, wherein said frames are each adjustably supported by a rear leg of the main frame of the conventional walker;

an armrest platform adjustably attached to each armrest support member at a horizontal location to help support the patient's weight with respect to the center of contact of the four wheels;

a pair of essentially vertically disposed handles each affixed to a respective armrest support member adjustably supported independent of said armrest platform to allow the patient to better steer said platform walker; and a removable utility tray assembly supported on each lateral side by a respective armrest platform for providing patient care services for the patient.

9. The improvement in a conventional walker of claim 8 including a armrest frame support and height adjustment assembly comprising:

a plurality of spaced apart frame apertures of each said main armrest frame member;

a plurality of spaced apart leg apertures at a top end of each said front leg; and a height adjustment fastener extending through one of said frame apertures and one of said leg apertures to adjustably establish a vertical height of said armrest platforms and said utility tray.

10. The improvement in a conventional walker of claim 9, wherein said height adjustment fastener is a spring loaded button extending from one of said plurality of frame apertures to engage one of said plurality of leg apertures and hold the armrest platforms at a desirable height.

11. The improvement in a conventional walker of claim 9, wherein each said armrest support member has a plurality of spaced apart support apertures and each one of said pair of armrest platforms has a plurality of armrest fasteners to affix said armrest platform to a respective armrest support member, so that said armrest platforms are horizontally adjusted.

12. The improvement in a conventional walker of claim 11 wherein each one of said vertical handles has threads at a lower end to engage one of a plurality of threaded apertures of said support apertures of said armrest support member to be horizontally adjusted independent of the horizontal location of said armrest platforms.

13. The improvement in a conventional walker of claim 8 wherein said utility tray assembly includes:

a tray top with a pair of side rails and a rear rail affixed to a top surface of said tray top;

a drawer assembly affixed to a bottom side of said tray top; and a pair of retainer pins to help position and hold said utility tray assembly on said armrest platforms.

14. The improvement in a conventional walker of claim 13, wherein said drawer assembly includes:

a pair of drawer guides each affixed to a bottom surface of said tray top and having a guide protrusion;

a pair of drawer sides, a drawer front, a drawer back and a drawer bottom, wherein said drawer sides are slideably carried by said guide protrusions of said drawer guides.

15. The improvement in a conventional walker of claim 8, wherein said utility tray assembly includes:

a tray top with a top surface and a bottom surface and supported on said armrest platforms;

a drawer assembly affixed to a bottom side of said tray top; and a retaining bar on each lateral side to position said tray top on said armrest platforms.

16. The improvement in a conventional walker of claim 15, wherein said drawer assembly includes:

a drawer frame having a top affixed to said bottom surface of said tray top and including two lateral sides and a bottom;

a patient care drawer slideably carried by said drawer frame.

17. A system for providing ambulatory assistance and patient care , said system comprising:

a rolling walker having a main frame including main frame front legs and main frame rear legs supported on four wheels so that said main frame can be folded for storage and transporting from place to place;

a seat with a padded back rest for providing basic support for the patient during periods of rest;

a pair of armrest frames each having a main armrest frame member with a plurality of frame apertures near a lower end;

an armrest support member affixed at an upper end of said each main armrest frame member;

a pair of height adjustment assemblies of the main frame to adjustably receive and support a respective armrest frame so that said armrest support members are essentially horizontally disposed at a vertical location above a ground surface;

an armrest platform adjustably attached and solidly connected by armrest attachments to each armrest support member at a horizontal location to best support the patient's weight;

a pair of vertically disposed handles each affixed to a respective armrest support member to be independently adjustable both vertically and horizontally with respect to a respective armrest platform, wherein said armrest platforms and said handles provide improved ambulatory assistance to the patient;

a hand brake associated with each vertical handle operated by the patient to stop two of said four wheels from rotating; and a removable utility tray assembly supported on each lateral side by a respective armrest platform for providing patient care services for the patient.

* * * * *